United States Patent
Shin et al.

(10) Patent No.: US 7,714,784 B2
(45) Date of Patent: May 11, 2010

(54) BASE STATION AND MOBILE TERMINAL FOR LOCATION DETECTION, AND LOCATION DETECTING METHOD

(75) Inventors: Chang-Sub Shin, Daejeon (KR); Hyun-Seo Oh, Daejeon (KR); Hyun Lee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1088 days.

(21) Appl. No.: 10/882,525

(22) Filed: Jun. 30, 2004

(65) Prior Publication Data

US 2005/0128142 A1 Jun. 16, 2005

(30) Foreign Application Priority Data

Dec. 10, 2003 (KR) ...................... 10-2003-0089733

(51) Int. Cl.
*G01S 1/08* (2006.01)
(52) U.S. Cl. ..................................................... 342/386
(58) Field of Classification Search ................. 701/215; 342/384–386, 455, 357.09, 464, 457, 445, 342/450; 455/561
See application file for complete search history.

(56) References Cited

U.S. PATENT DOCUMENTS

| | | | |
|---|---|---|---|
| 5,583,517 A * | 12/1996 | Yokev et al. | 342/457 |
| 5,604,765 A | 2/1997 | Bruno et al. | |
| 5,614,914 A * | 3/1997 | Bolgiano et al. | 342/364 |
| 5,952,958 A * | 9/1999 | Speasl et al. | 342/357.08 |
| 6,188,353 B1 | 2/2001 | Mitchell | |
| 6,516,285 B1 | 2/2003 | Hori et al. | |
| 7,157,405 B2 * | 1/2007 | Suzuki et al. | 502/339 |
| 7,257,405 B2 * | 8/2007 | Yamato et al. | 455/445 |

FOREIGN PATENT DOCUMENTS

| | | |
|---|---|---|
| JP | 2001-289653 | 10/2001 |
| JP | 2003-125436 | 4/2003 |
| KR | 1020020023869 | 3/2002 |
| KR | 1020030003431 | 1/2003 |

OTHER PUBLICATIONS gpsOne: A hybrid position location system, pp. 330-335.
The IEEE 5th International Conference on Intelligent Transportation Systems, Sep. 3-6, 2002, Singapore, pp. 926-931.

* cited by examiner

*Primary Examiner*—Thomas H Tarcza
*Assistant Examiner*—Nga X Nguyen
(74) *Attorney, Agent, or Firm*—Blakely, Sokoloff, Taylor & Zafman LLP

(57) ABSTRACT

Disclosed are a base station and a mobile terminal for location detection, and a location detecting method. The base station in which a plurality of antennas having RF modules are installed transmits a signal including location information of each of the antennas to the mobile terminal. The mobile terminal carries out location detection by selectively using location information received from a GPS receiver or location information received from a DSRC transceiver. The base station and mobile terminal for location detection can perform location detection with high accuracy using the existing DSRC service. Thus, the base station and mobile terminal can carry out location detection having an error of approximately 10 m in downtown areas or buildings.

7 Claims, 6 Drawing Sheets

BASE STATION AND MOBILE TERMINAL FOR LOCATION DETECTION, AND LOCATION DETECTING METHOD

CROSS REFERENCE TO RELATED APPLICATION

This application claims priority to and the benefit of Korea Patent Application No. 2003-89733 filed on Dec. 10, 2003 in the Korean Intellectual Property Office, the entire content of which is incorporated herein by reference.

BACKGROUND OF THE INVENTION (a) Field of the Invention

The present invention relates to a base station and a mobile terminal for location detection, and a location detecting method. More specifically, the present invention relates to a base station and a mobile terminal for location detection, and a location detecting method using a GPS technique and dedicated short range communication (DSRC).

(b) Description of the Related Art

Methods for detecting locations of mobile terminals include a technique that decides a location of a base station having a cell ID as a location of a mobile terminal, an AOA (Arrival Of Angle) method by which a base station determines a location of a mobile terminal through a direction angle of a signal transmitted from the mobile terminal, and a TDOA (Time Difference Of Arrival) method that detects a location of a mobile terminal using a time difference of arrival of a signal between the mobile terminal and a base station. The location detecting methods further include a technique that detects a location of a mobile terminal through a combination of the AOA and TDOA methods, RF fingerprinting that compares an RF characteristic value of a signal received from a mobile terminal with a value stored in a database to detect a location of the mobile terminal, a technique using a global positioning system (GPS), and a network-assisted GPS method.

In the method using a GPS, a mobile terminal receives signal information of the GPS such that a location of the mobile terminal is detected.

This method is easy to use and can detect a relatively accurate location of the mobile terminal outdoors. However, it consumes a large amount of electric power, requires a long time to first fix (TTFF), and has many restrictions on location detection indoors and in downtown areas due to interference of multiple paths and an insufficient number of visible satellites.

With the network-assisted GPS method, which is one method for is solving the problems of the GPS method, a mobile terminal can be provided with assistant data required for obtaining a list of satellites and satellite signals from a base station to reduce the time to first fix and additionally receive a correction signal.

The method using a cell ID can easily detect a location of a mobile terminal without modifying the existing equipment. However, this method has a problem in that accuracy of a location detecting result varies with a cell diameter. For example, a macro-call has an error of approximately 20 Km in diameter, a micro-cell has an error of 0.5 to 1 Km in diameter, and a pico-cell has an error of about 50 m in diameter.

With the AOA method, a base station measures a direction angle of a signal transmitted from a mobile terminal using an array antenna to detect a location of- the mobile terminal. However, this technique has a large location error because it is difficult to secure LOS (Line Of Sight) due to a multi-path in downtown areas. Furthermore, since the AOA method requires an array antenna, the mobile terminal has difficulty in using the method.

The TDOA method calculates a distance between a mobile terminal and a base station using a one-way signal arrival time between the mobile terminal and base station. With this method, a final location of the mobile terminal is detected from intersecting points of circles having three base stations at their centers. However, this technique has poor location accuracy.

The RF fingerprinting is an auxiliary location detecting method used to detect a location of a mobile terminal in downtown areas or inside buildings where the method using a GPS is difficult to use. This technique should continuously update a database according to a geographical environment and a channel state. In addition, its location detection performance is deteriorated due to a plurality of mobile terminals.

As described above, conventional location detecting methods are divided into techniques using a GPS and techniques not using GPS.

The techniques using a GPS have geographical restrictions that require LOS to be secured, need a long time to first fix, and consume a large amount of electric power, although they can detect a location of a mobile terminal relatively easily.

To solve the aforementioned problems, the network assisted GPS method allows a mobile terminal to receive information required for GPS location detection from the nearest base station. Thus, this method can reduce time and power consumption required for location detection. A network based location detecting method is used in areas where GPS location detection is impossible, such as downtown areas or indoor areas. However, the network assisted GPS method has a problem in that a location detection error is increased depending on a cell area when a location of a mobile terminal is detected using a network.

Among the techniques not using GPS, the AOA method can be used only in a base station because it requires an array antenna. Furthermore, a location detection error is increased due to a multi-path effect in downtown areas. As a distance between a mobile terminal and the base station is increased, the location detection error is also increased.

The TDOA method generates an error caused by locations of base stations, an error due to a multi-path in downtown areas, an error caused by a near-far problem due to a high reception signal from a near base station, and so on.

Methods other than the above-described techniques also have restrictions on location detection with high accuracy.

SUMMARY OF THE INVENTION

It is an advantage of the present invention to provide a base station and a mobile terminal for location detection, and a location detecting method for accurately detecting a location of a mobile terminal by selectively using a GPS technique and DSRC.

To accomplish the object of the present invention, a base station in which a plurality of antennas having RF modules are installed transmits a signal including location information of each of the antennas to a mobile terminal. The mobile terminal carries out location detection by selectively using location information received from a GPS receiver or location information received from a DSRC transceiver.

In one aspect of the present invention, a base station for location detection includes a location information generator for generating location information of each of a plurality of antennas arranged at specific intervals; a central processing unit for preventing the antennas from interfering with one another, processing data transmitted and received between the base station and a mobile terminal, and generating a periodic beacon signal and transmitting it to the mobile terminal; a location information processor for loading the location information of each of the antennas generated by the location information generator in a header of the beacon signal and transmitting the beacon signal to a corresponding antenna; and a modulating/demodulating unit for converting data transmitted and received between the central processing unit and the antennas into an analog or digital signal.

The base station further includes a plurality of multiplexers for simultaneously outputting the beacon signal transmitted from the central processing unit through the modulating/demodulating unit to the antennas.

The base station further includes a buffer for receiving data transmitted from the mobile terminal through the plurality of antennas and delivering the data to the modulating/demodulating unit.

Preferably, a cell diameter of each of the antennas is 10 to 15 m.

In another aspect of the present invention, a mobile terminal for location detection includes a GPS receiver for detecting a location of a base station using a GPS; a DSRC transceiver for extracting location information from a beacon signal transmitted from the base station in an area where location detection is impossible through the GPS receiver to detect the location of the base station; and a central processing unit for extracting location detection data through the GPS receiver or the DSRC transceiver, and displaying it on a map.

In another aspect of the present invention, a location detecting method comprises a) generating location information of each of a plurality of antennas arranged at specific intervals and loading the location information in a header of a beacon signal to be transmitted to a mobile terminal; and b) synchronizing the antennas and simultaneously transmitting the beacon signal to the antennas.

The step a) comprises carrying out output cell planning such that the antennas maintain the specific intervals in order to remove interference of the antenna cells.

In another aspect of the present invention, a location detecting method comprises a) detecting a beacon signal including location information, transmitted from a base station, through a DSRC module installed in a mobile terminal; b) when the beacon signal is detected, extracting the location information from the beacon signal to use as location detection data; and c) when the beacon signal is not detected, using location detection data detected using a GPS.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
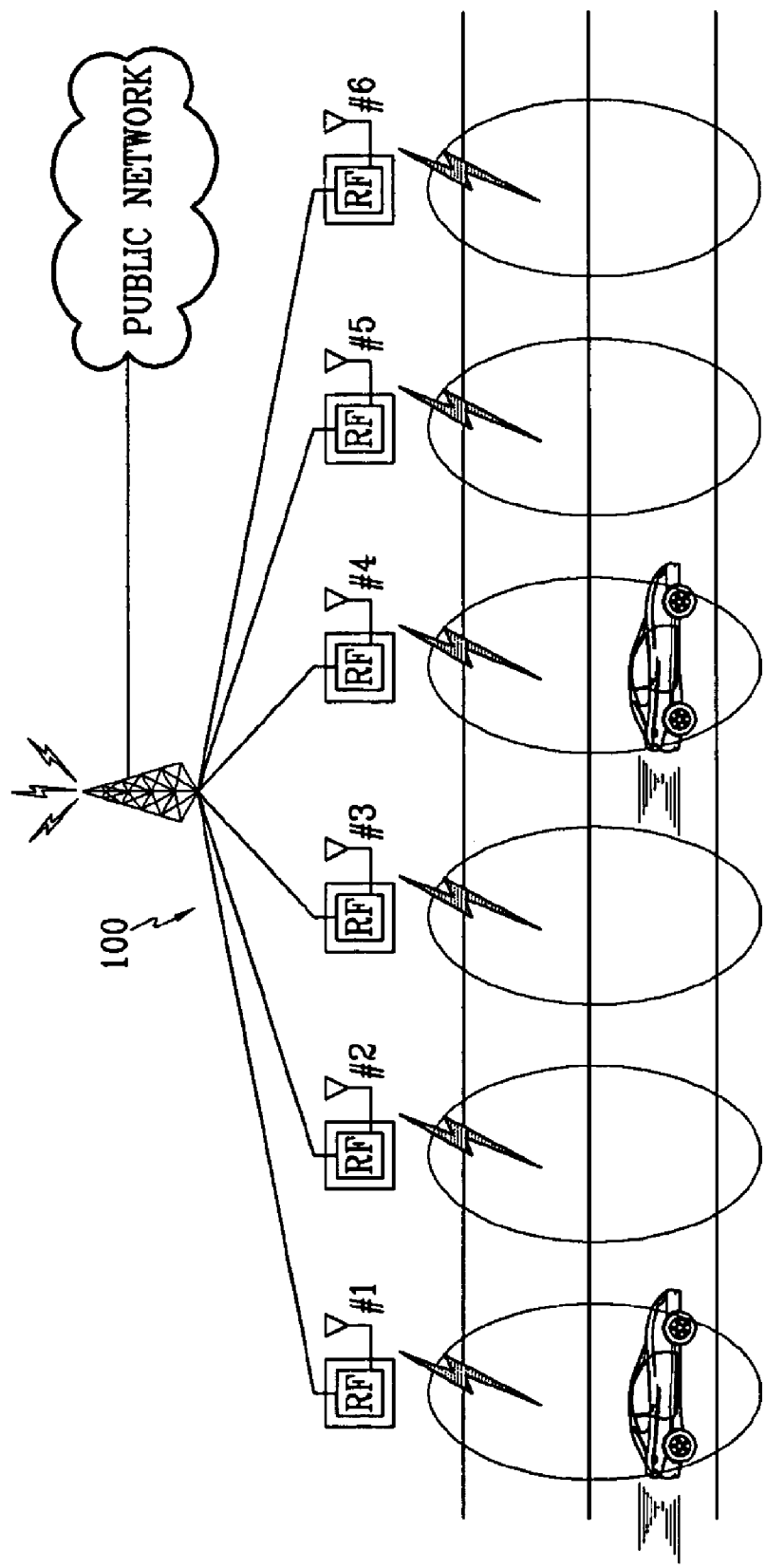
FIG. 1 shows a configuration of a base station for location detection according to a first embodiment of the present invention.

First, a base station for location detection according to a first embodiment of the present invention is explained in detail with reference to FIGS. 1, 2, and 3. FIG. 1 shows a configuration of a base station for location detection according to a first embodiment of the present invention, FIG. 2 shows a configuration for downward communication of the base station for location detection according to the first embodiment of the present invention, and FIG. 3 shows a configuration for upward communication of the base station for location detection according to the first embodiment of the present invention.

Figure 2:
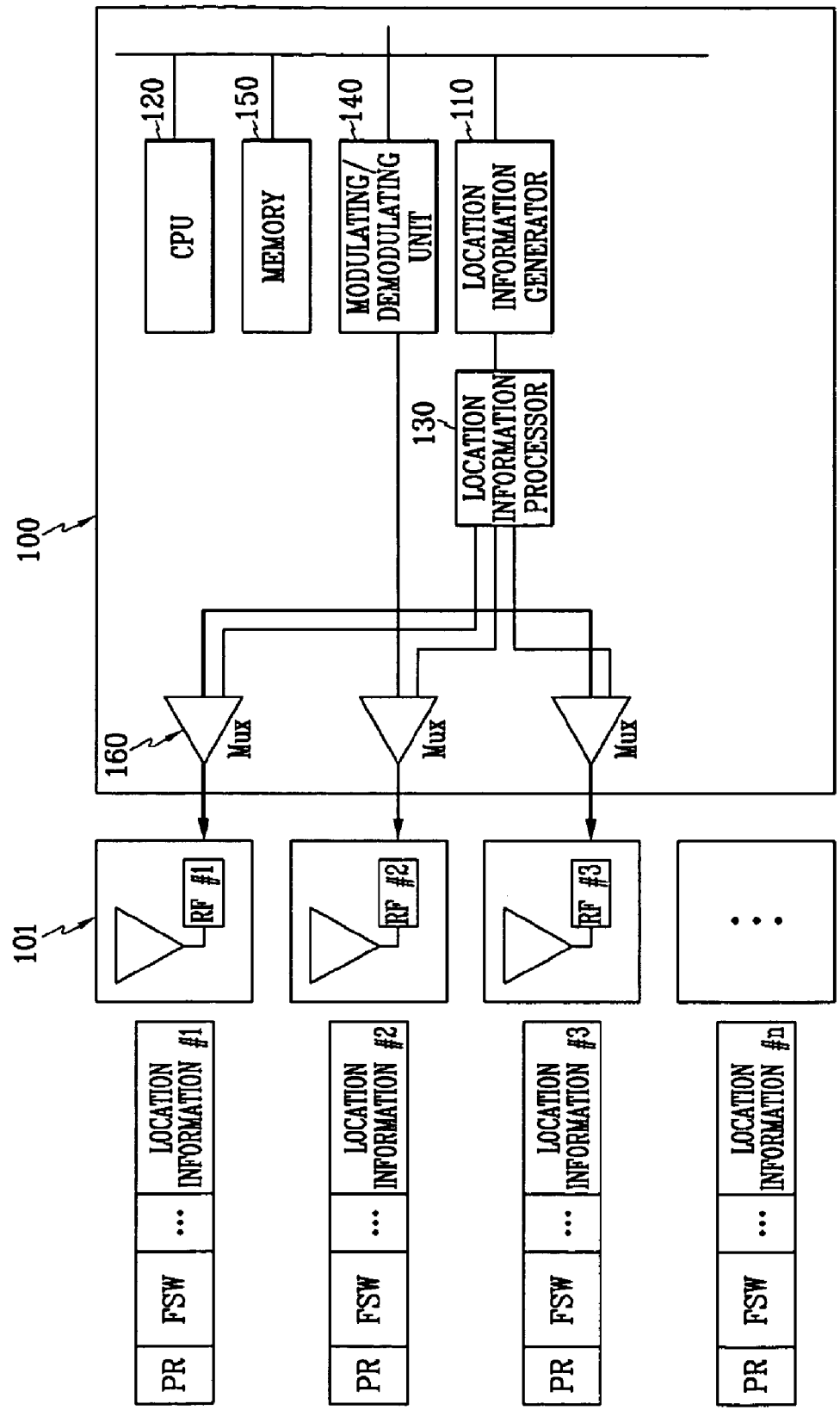
FIG. 2 shows a configuration for downward communication of the base station for location detection according to the first embodiment of the present invention.
Figure 3:
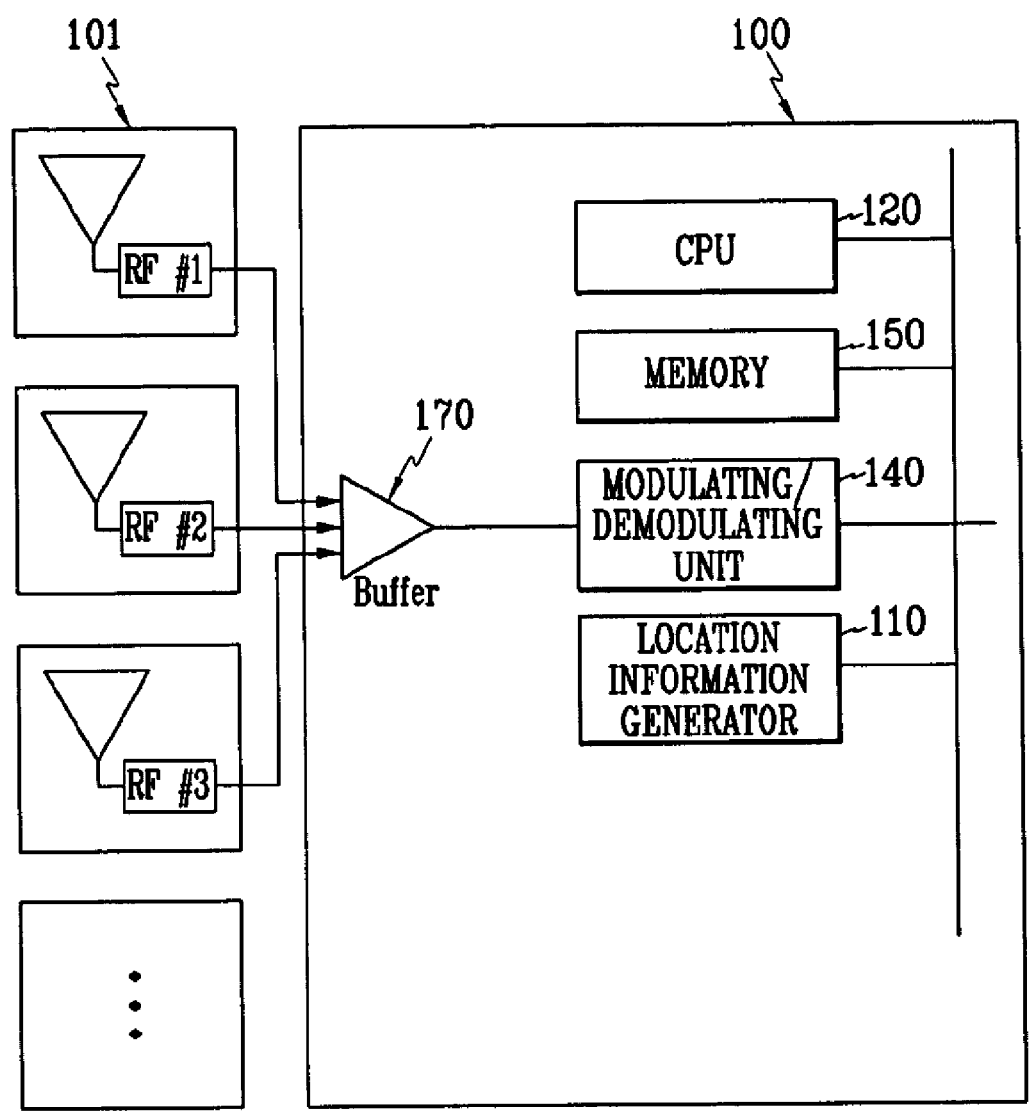
FIG. 3 shows a configuration for upward communication of the base station for location detection according to the first embodiment of the present invention.

Referring to FIGS. 1, 2, and 3, the base station 100 according to the first embodiment of the invention includes a plurality of antennas 101 each of which has an RF module, a location information generator 110, a central processing unit 120, a location information processor 130, a modulating/demodulating unit 140, a memory 150, a plurality of multiplexers 160, and a buffer 170.

A cell diameter of each of the antennas 101 is set to 10 to 15 m, such that accuracy of location information in each cell is improved.

The location information generator 110 generates location information of each of the antennas 101. The central processing unit 120 prevents the plurality of antennas from interfering with one another, and processes data transmitted and received between the base station and a mobile terminal. In addition, the central processing unit 120 generates a periodic beacon signal and sends it to the mobile terminal.

The location information processor 130 loads the location information of each antenna, generated by the location information generator 120, in the header of the beacon signal and transmits the beacon signal to the antennas simultaneously. The modulating/demodulating unit 140 converts data transmitted and received between the central processing unit 120 and the plurality of antennas 101 into a digital or analog signal, and transmits it to the multiplexers 160 or central processing unit 120.

The multiplexers 160 simultaneously transmit the beacon signal including the location information of the antennas, sent from the central processing unit 120 and location information processor 130, to the antennas. The buffer 170 receives data transmitted from the mobile terminal through the plurality of antennas and delivers the data to the modulating/demodulating unit 140. The memory 150 stores data transmitted to/from the central processing unit 120.

Figure 4:
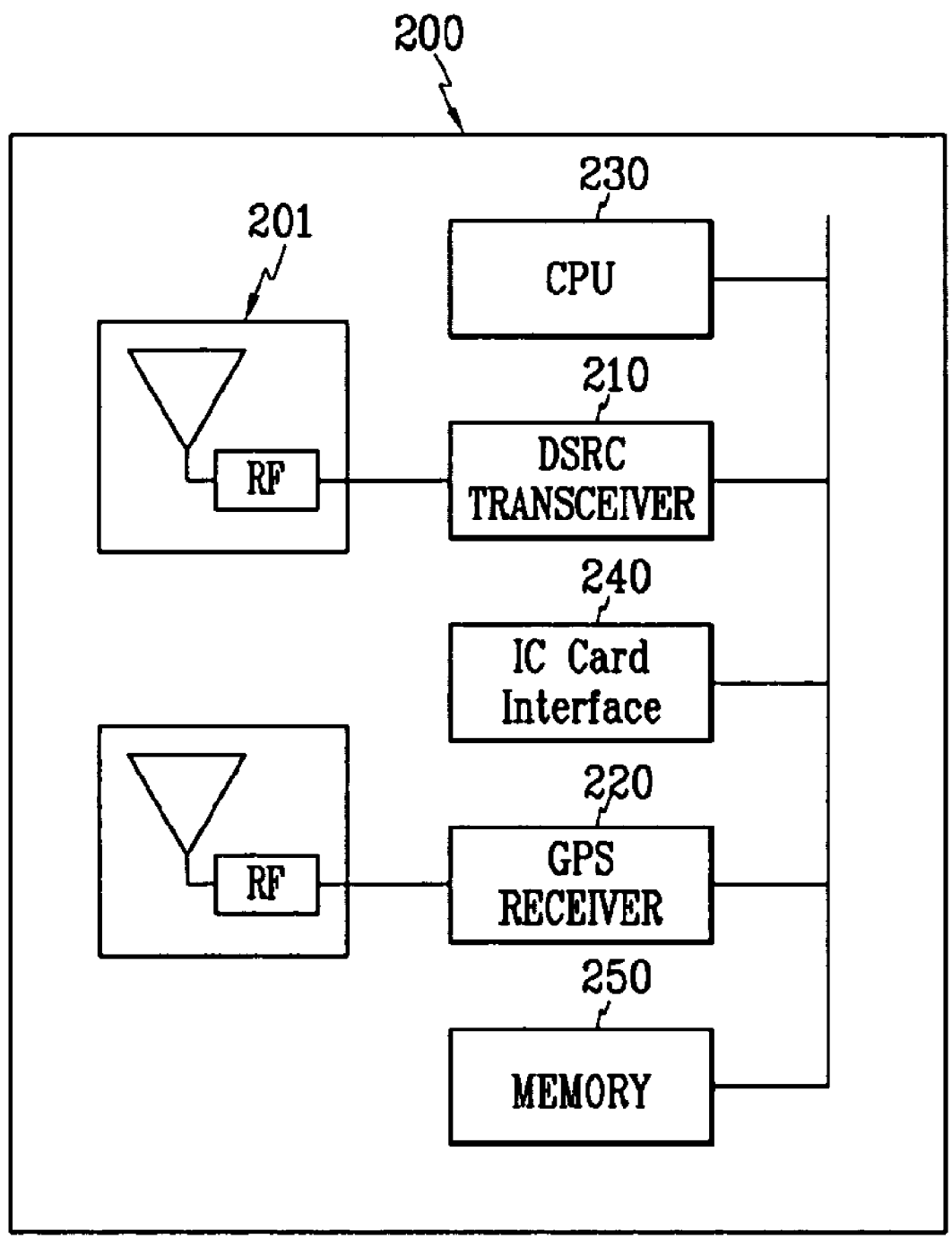
FIG. 4 shows a configuration of a mobile terminal for location detection according to a second embodiment of the present invention.

FIG. 4 shows a configuration of a mobile terminal for location detection according to a second embodiment of the present invention.

Referring to FIG. 4, the mobile terminal 200 includes antennas 201 respectively having RF modules, a DSRC transceiver 210, a GPS receiver 220, a central processing unit 230, an IC card interface 240, and a memory 250.

The mobile terminal extracts location information from the header of the beacon signal transmitted from the base station in an area where location detection is impossible through the GPS receiver 220 to detect a location of the base station.

The GPS receiver 220 detects the location of the base station using a GPS. When the DRSC transceiver 210 does not detect the beacon signal, the central processing unit 230 calls location detection data from the GPS receiver 220. The IC card interface 240 is interfaced to an IC card used for communication. The IC card stores personal information and processes codes, and has high security. The memory 250 stores data input/output to/from the mobile terminal 200.

Operations of the base station and mobile terminal according to the present invention are described below with reference to FIGS. 5 and 6.

Figure 5:
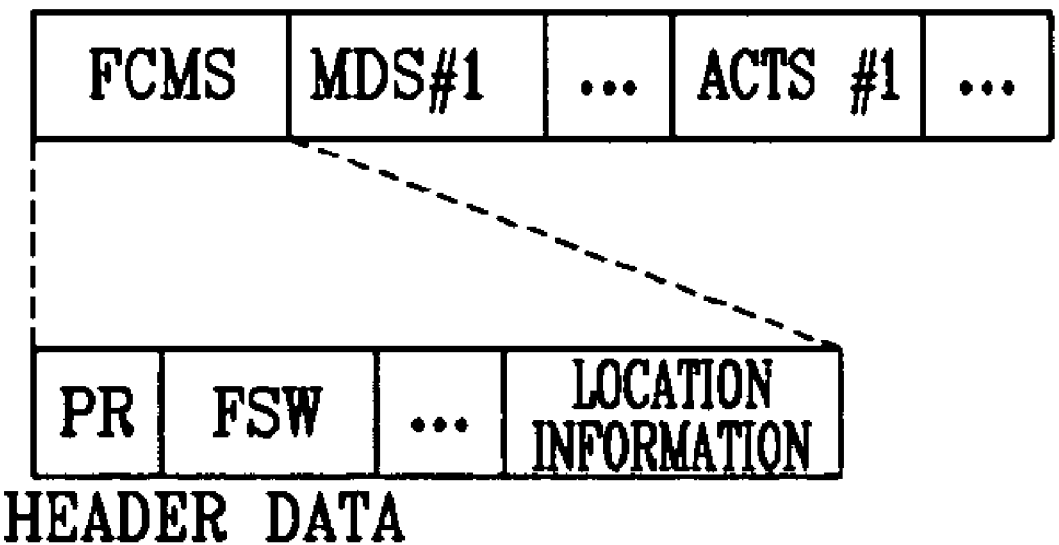
FIG. 5 shows a format of a communication frame generated in a base station of the present invention.
Figure 6:
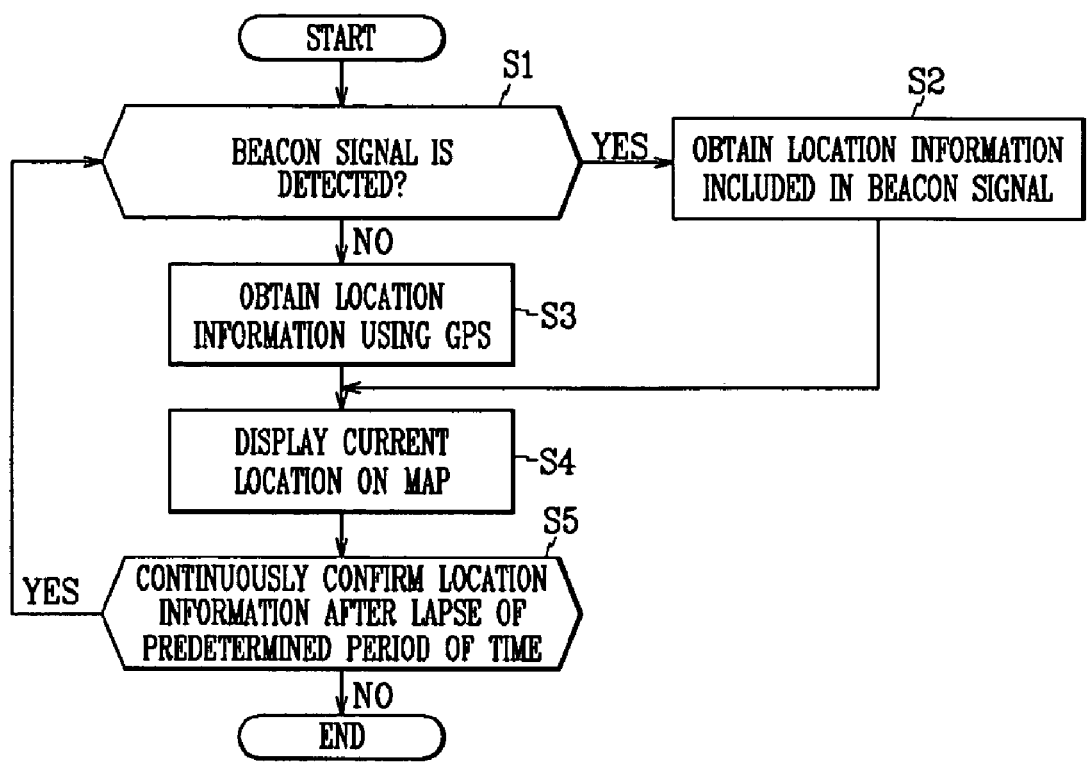
FIG. 6 is a flow chart of a location detecting method executed by a mobile terminal of the present invention.

FIG. 5 shows a format of a communication frame generated in the base station of the present invention, and FIG. 6 is a flow chart of a location detecting method executed by the mobile terminal of the present invention.

The plurality of antennas respectively having RF modules are arranged at specific intervals in the base station 100. The location information generator 110 generates location information of each of the antennas. The location information is included in a header frame of the beacon signal that is periodically generated by the central processing unit 120 of the base station 100 and transmitted to the mobile terminal 200. At this time, the central processing unit performs cell planning such that the antennas maintain specific intervals or switch adjacent antenna cells to transmit or receive signals in order to prevent interference of the antennas. Furthermore, the central processing unit 120 synchronizes the antennas in order to simultaneously output the beacon signal to the antennas through the multiplexers 160.

The base station 100 receives data from the mobile terminal 200 through the buffer 170, similar to a base station having a single antenna.

Referring to FIG. 6, when the mobile terminal 200 is turned on, the mobile terminal 200 detects the beacon signal transmitted from the base station 100 through the DSRC transceiver 210 in step S1. When the beacon signal is detected, the central processing unit 230 of the mobile terminal 200 extracts the location information included in the beacon signal to use it as location detection data in step S2. When the beacon signal is not detected, the central processing unit 230 obtains location detection data through the GPS receiver 220 in step S3.

In step S4, the central processing unit displays a current location of the base station on a map using the location detection data obtained through the DSRC transceiver 210 or GPS receiver 220. The location detection data can be used for various application services including a real-time transportation information providing service, a broadcasting service, a real-time circulation service, and so on. In particular, the location detection data can be used for a car navigation system.

When a predetermined period of time has passed after the location detection is completed, the central processing unit 230 repeatedly extracts location detection data using the DSRC transceiver 210 or GPS receiver 220 in step S5. The DSRC transceiver 210 can be used for conventional short range radio communication as well as location detection.

As described above, the base station and mobile terminal for location detection, and a location detecting method of the present invention, can perform location detection with high accuracy using the existing DSRC service. Thus, a system for detecting a location can be constructed at a low cost and easily extended. Furthermore, the present invention can carry out location detection having an error of approximately 10 m in downtown areas or buildings.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A base station for detecting a location of an outdoor mobile terminal, comprising:
    a location information generator for generating location information of each of a plurality of antennas arranged at specific intervals;
    a central processing unit for processing data transmitted and received between the base station and the mobile terminal, and generating a periodic beacon signal for transmission to the mobile terminal;
    a location information processor for loading the location information of each of the antennas in a header of the beacon signal from the central processing unit, and transmitting the beacon signal with the header to a corresponding antenna, the location information of the corresponding antenna indicating an approximate location of the mobile terminal;
    a modulating/demodulating unit for converting data transmitted and received between the central processing unit and the antennas into an analog or digital signal; and
    a plurality of multiplexers, with each multiplexer associated with one of the antennas and multiplexing at an input end of each multiplexer between the beacon signal and the converted data, the plurality of multiplexers simultaneously outputting the beacon signal, including the header, to the antennas, wherein the beacon signal is transmitted from the location information processor and the converted data is transmitted from the modulating/demodulating unit.

2. The base station as claimed in claim 1, further comprising a buffer for receiving data transmitted from the mobile terminal through the plurality of antennas and delivering the data to the modulating/demodulating unit.

3. The base station as claimed in claim 1, wherein the cell covered by each of the antennas has a diameter of 10 to 15 m.

4. A location detecting method comprising:
    a) generating location information of each of a plurality of antennas arranged at specific intervals and loading the location information in a header of a beacon signal for transmission to a corresponding antenna, the location information indicating an approximate location of a mobile terminal;
    b) synchronizing the antennas; and
    c) multiplexing, using a plurality of multiplexers with each multiplexer associated with one of the antennas, at an input end of each multiplexer between the beacon signal and converted data from a modulating/demodulating unit, the plurality of multiplexers simultaneously outputting the beacon signal, including the header, to the antennas.

5. The location detecting method as claimed in claim 4, further comprising receiving data from the mobile terminal through the antennas and processing the data.

6. The location detecting method as claimed in claim 4, wherein a) comprises switching reception and transmission of adjacent antenna cells in order to remove cell interference of the adjacent antenna cells.

7. The location detecting method as claimed in claim 4, wherein a) comprises carrying out output cell planning such that the antennas maintain the specific intervals in order to remove interference of the antenna cells.

* * * * *